US009169433B2

(12) United States Patent
Nguyen et al.

(10) Patent No.: US 9,169,433 B2
(45) Date of Patent: Oct. 27, 2015

(54) METHODS FOR ENHANCING WELL PRODUCTIVITY AND MINIMIZING WATER PRODUCTION USING SWELLABLE POLYMERS

(71) Applicant: Halliburton Energy Services, Inc., Houston, TX (US)

(72) Inventors: Philip D. Nguyen, Houston, TX (US); Jimmie D. Weaver, Duncan, OK (US)

(73) Assignee: Halliburton Energy Services, Inc., Houston, TX (US)

( * ) Notice: Subject to any disclaimer, the term of this patent is extended or adjusted under 35 U.S.C. 154(b) by 279 days.

(21) Appl. No.: 13/628,103

(22) Filed: Sep. 27, 2012

(65) Prior Publication Data
US 2014/0083696 A1 Mar. 27, 2014

(51) Int. Cl.
*E21B 43/267* (2006.01)
*C09K 8/80* (2006.01)

(52) U.S. Cl.
CPC ............... *C09K 8/805* (2013.01); *E21B 43/267* (2013.01)

(58) Field of Classification Search
CPC ......... E21B 43/267; C09K 8/80; C09K 8/805
USPC ........... 166/308.2, 308.5, 308.1, 280.1, 280.2
See application file for complete search history.

(56) References Cited

U.S. PATENT DOCUMENTS

| | | | |
|---|---|---|---|
| 4,040,967 A * | 8/1977 | Nimerick et al. ............. 507/211 |
| 4,585,064 A | 4/1986 | Graham et al. |
| 4,670,501 A | 6/1987 | Dymond et al. |
| 5,249,627 A | 10/1993 | Harms et al. |
| 5,370,184 A * | 12/1994 | McDougall et al. .......... 166/278 |
| 5,833,000 A | 11/1998 | Weaver et al. |
| 5,839,510 A | 11/1998 | Weaver et al. |
| 5,853,048 A | 12/1998 | Weaver et al. |
| 5,905,061 A | 5/1999 | Patel |
| 5,977,031 A | 11/1999 | Patel |
| 6,287,639 B1 | 9/2001 | Schmidt et al. |
| 6,311,773 B1 | 11/2001 | Todd et al. |
| 6,439,309 B1 | 8/2002 | Matherly et al. |
| 6,582,819 B2 | 6/2003 | McDaniel et al. |
| 6,677,426 B2 | 1/2004 | Noro et al. |
| 6,828,279 B2 | 12/2004 | Patel et al. |
| 7,131,491 B2 | 11/2006 | Blauch et al. |
| 7,153,575 B2 | 12/2006 | Anderson et al. |
| 7,350,579 B2 | 4/2008 | Gatlin et al. |
| 7,392,847 B2 | 7/2008 | Gatlin et al. |
| 7,534,745 B2 | 5/2009 | Taylor et al. |
| 7,645,723 B2 | 1/2010 | Kirsner et al. |
| 7,673,686 B2 | 3/2010 | Nguyen et al. |
| 7,696,131 B2 | 4/2010 | Oyler et al. |
| 7,819,192 B2 | 10/2010 | Weaver et al. |
| 7,825,074 B2 | 11/2010 | Schmidt et al. |
| 7,956,017 B2 | 6/2011 | Gatlin et al. |
| 8,003,579 B2 | 8/2011 | Akarsu et al. |
| 8,058,213 B2 * | 11/2011 | Rediger et al. ................ 507/269 |
| 8,076,271 B2 | 12/2011 | Blauch et al. |
| 8,136,595 B2 | 3/2012 | Weaver et al. |
| 8,168,739 B2 | 5/2012 | Kitamura et al. |
| 8,261,833 B2 | 9/2012 | Nguyen et al. |
| 2007/0289781 A1 | 12/2007 | Rickman et al. |
| 2008/0006405 A1 | 1/2008 | Rickman et al. |
| 2008/0017376 A1 | 1/2008 | Badalamenti et al. |
| 2009/0120647 A1 | 5/2009 | Turick et al. |
| 2009/0176667 A1 | 7/2009 | Nguyen |
| 2009/0294126 A1 | 12/2009 | Dalrymple et al. |
| 2010/0096334 A1 | 4/2010 | Edmiston |
| 2010/0147507 A1 | 6/2010 | Korte et al. |
| 2010/0160187 A1 | 6/2010 | Nguyen et al. |
| 2010/0179281 A1 | 7/2010 | Nilsen |
| 2010/0314115 A1 | 12/2010 | Moradi-Araghi et al. |
| 2011/0039737 A1 | 2/2011 | Schmidt et al. |
| 2011/0098377 A1 | 4/2011 | Huang et al. |
| 2011/0098394 A1 | 4/2011 | Schmeltzer et al. |
| 2013/0233545 A1 * | 9/2013 | Mahoney et al. .......... 166/280.2 |
| 2013/0248191 A1 * | 9/2013 | Nguyen .................... 166/308.1 |

FOREIGN PATENT DOCUMENTS

CA 2636331 A1 8/2007

OTHER PUBLICATIONS

Official Action for CA Patent Application No. 2,826,697 dated Nov. 20, 2014.

* cited by examiner

*Primary Examiner* — Angela M DiTrani
*Assistant Examiner* — Silvana Runyan
(74) *Attorney, Agent, or Firm* — McDermott Will & Emery LLP; Craig W. Roddy

(57) ABSTRACT

Methods of treating a subterranean formation with a treatment fluid comprising a swellable organic polymer coated onto proppant particulates. The swellable organic polymer is water-swellable, having a swelled configuration when contacted with water and an unswelled configuration in the absence of water contact. The treatment fluid may be introduced into the subterranean formation, where the swellable organic polymer adopts the swelled configuration and is placed in a fracture. During hydrocarbon production, the swellable organic polymer adopts the unswelled configuration.

20 Claims, No Drawings

METHODS FOR ENHANCING WELL PRODUCTIVITY AND MINIMIZING WATER PRODUCTION USING SWELLABLE POLYMERS

BACKGROUND

The present invention relates to methods for enhancing well productivity and minimizing water production using swellable polymers.

Various methods are known for fracturing a subterranean formation to enhance the production of fluids. In a hydraulic fracturing operation, a pressurized fracturing fluid can be used to hydraulically create and propagate a fracture within the subterranean formation. Fracturing fluids can also carry and deposit solids such as proppants into the fracture. Inside the fracture, the proppants can form a tightly packed permeable mass (sometimes referred to as a "proppant pack"). The proppant pack serves as a physical barrier that prevents the fracture from fully closing and as a conduit through which production fluids can flow. The degree of success of a fracturing operation depends, at least in part, upon the fracture conductivity once the fracturing operation is stopped, the hydraulic pressure is removed, and production is begun. The conductivity of these proppant packs may be limited because of the relatively small interconnected interstitial spaces between the packed proppant.

A fracturing approach that involves placing a much reduced volume of proppants in a fracture has been used to increase the size of the interconnected interstitial spaces in proppant packs. In such operations, the proppant particulates within the fracture may be widely spaced but still sufficient to hold the fracture open and allow for production fluids to flow. An increased fracture conductivity may result due to the fact that the produced fluids may flow around widely spaced proppant rather than through the relatively small interstitial spaces within a proppant pack. While this fracturing concept has been investigated in the industry, its widespread usefulness is still somewhat limited for a number of reasons. Among other things, settling of proppant can be particularly problematic when fracturing with a reduced volume of proppants. Proppant settling may lead to a fracture or a top portion of a fracture closing, which can lower the conductivity of the propped fracture and result in proppant aggregation, rather than discrete proppant pillars, thereby defeating any added benefit of the widely spaced proppant. Water encroachment depends on the location of the water zone with respect to the oil producing interval and the rate at which oil is produced. Generally, the closer a water zone is to an oil producing interval and the higher the rate of oil production, the more likely water encroachment will occur. The resulting water production may lead to a number of issues including poor hydrocarbon recovery efficiencies, completion inefficiencies, and well maintenance problems including, but not limited to, sand production, sand separation, sand disposal, water separation, or water disposal. Therefore, a method of preparing widely spaced proppant in proppant packs that are not susceptible to partial or complete fracture closure and that are capable of reducing or minimizing water encroachment during fracturing and production operations may be of benefit to one of ordinary skill in the art.

SUMMARY OF THE INVENTION

The present invention relates to methods for enhancing well productivity and minimizing water production using swellable polymers.

In some embodiments, the present invention provides a method of treating a subterranean formation comprising: providing a treatment fluid comprising a base fluid and proppant particulates coated with a swellable organic polymer to form swellable organic polymer coated proppant particulates, wherein the swellable organic polymer coated proppant particulates are water-swellable, having a swelled configuration when contacted with water and an unswelled configuration in the absence of water contact; introducing the treatment fluid into a fracture in the subterranean formation; swelling the swellable organic polymer coated proppant particulates so as to adopt the swelled configuration and form a proppant pack in the fracture; and unswelling the swellable organic polymer coated proppant particulates so as to adopt the unswelled configuration during hydrocarbon production.

In other embodiments, the present invention provides a method of treating a subterranean formation comprising: providing a treatment fluid comprising a base fluid, proppant particulates, and swellable organic polymer particulates, wherein the swellable organic polymer particulates are water-swellable, having a swelled configuration when contacted with water and an unswelled configuration in the absence of water contact; introducing the treatment fluid into a fracture in the subterranean formation; swelling the swellable organic polymer particulates so as to adopt the swelled configuration and form a proppant pack in the fracture; and unswelling the swellable organic polymer particulates so as to adopt the unswelled configuration during hydrocarbon production.

In still other embodiments, the present invention provides a method of treating a subterranean formation comprising: providing a treatment fluid comprising a base fluid, proppant particulates, and swellable organic polymer particulates, wherein the swellable organic polymer particulates are water-swellable, having a swelled configuration when contacted with water and an unswelled configuration in the absence of water contact; encapsulating the swellable organic polymer particulates in a degradable encapsulating material; introducing the treatment fluid into a fracture in the subterranean formation; degrading the degradable encapsulating material; swelling the swellable organic polymer particulates so as to adopt the swelled configuration and form a proppant pack in the fracture; and unswelling the swellable organic polymer particulates so as to adopt the unswelled configuration during hydrocarbon production.

The features and advantages of the present invention will be readily apparent to those skilled in the art upon a reading of the description of the preferred embodiments that follows.

DETAILED DESCRIPTION

The present invention relates to methods for enhancing well productivity and minimizing water production using swellable polymers.

The present invention provides methods for enhancing the conductivity of proppant packs during fracturing and hydrocarbon production operations while decreasing water encroachment. As used herein, the term "proppant pack" may include an agglomeration or consolidation of proppant particulates into a mass capable of holding open a subterranean fracture under closure stress. In some embodiments, consolidation of the proppant particulates into proppant packs can form a hard permeable mass having sufficient compressive and tensile strength to prevent unconsolidated proppant and formation sand and produced water from flowing out of a fracture with treatment or produced fluids.

Traditional hydraulic fracturing treatments often involve pumping a high volume of proppant particulates into a fracture within a subterranean formation in order to provide sufficient fracture width to prevent the fracture from closing after the hydraulic pressure is removed once fracturing operations are complete. The high volume of proppant particulates, however, often results in diminished hydrocarbon production due to the relatively small interstitial spaces between the individual proppant particulates through which the produced fluids must flow toward the wellbore. Placing a lesser volume of proppant particulates may widen the interstitial spaces but may not possess sufficient fracture width to hold open the fracture open.

In some embodiments of the present invention, an organic polymer that swells when contacted with water is used in particulate form ("swellable organic polymer particulate") or as a proppant particulate coating ("swellable organic polymer coated proppant particulate") to create a high porosity propped fracture during the hydrocarbon production and to reduce or prevent significant water production during water encroachment stage. As used herein, the term "high porosity propped fracture" refers to a fracture that exhibits a porosity of greater than about 40% after the fracture has closed or other substantial mechanical stress has been applied.

In some embodiments, the present invention provides a method of treating a subterranean formation comprising providing a treatment fluid comprising a base fluid and proppant particulates coated with a swellable organic polymer to form swellable organic polymer coated proppant particulates. The swellable organic polymer has a swelled configuration when contacted with water and an unswelled configuration in the absence of water contact. The swellable organic polymer coated proppant particulates are then slurried into the base fluid to create a treatment fluid that is then placed into a fracture in the subterranean formation. Either in transit or once in place, the swellable organic polymer swells in the presence of water to adopt the swelled configuration and to form a proppant pack in the fracture. Once the aqueous fluid (often the base fluid itself) is removed and hydrocarbon production begins, the swellable organic polymer that coats proppant particulates adopts the unswelled configuration, thus opening the interstitial spaces and allowing production. During the water production phase, as more water is produced back (i.e., a higher water cut), the swellable organic polymer particulates and/or the swellable organic polymer coated proppant particulates may adopt the swelled configuration to decrease the water production. In some embodiments the treatment fluid may contain uncoated proppant along with the swellable organic polymer coated proppant particulates.

In other embodiments, the present invention provides a method of treating a subterranean formation comprising providing a treatment fluid comprising a base fluid, proppant particulates, and swellable organic polymer particulates. The swellable organic polymer particulates have a swelled configuration when contacted with water and an unswelled configuration in the absence of water contact. The swellable organic polymer particulates and the proppant particulates are then slurried into the base fluid to create a treatment fluid that is then placed into a fracture in the subterranean formation. Either in transit or once in place, the swellable organic polymer particulates swell in the presence of water to adopt the swelled configuration and to form a proppant pack in the fracture. Once the aqueous fluid (often the base fluid itself) is removed and hydrocarbon production begins, the swellable organic polymer particulates adopt the unswelled configuration, thus opening the interstitial spaces and allowing production.

In some embodiments the treatment fluid may contain uncoated proppant particulates along with the swellable organic polymer coated proppant particulates. In still other embodiments the treatment fluid may comprise the combination of proppant particulates, swellable organic polymer coated proppant particulates, and swellable organic polymer particulates.

The swellable organic polymer particulates or swellable organic polymer coated proppant particulates may be introduced into a fracture in the swelled configuration either alone or between proppant particulates to form a proppant pack or may be made to swell after placement. Once hydrocarbon production begins, the swellable organic polymer is contacted with the hydrocarbons and changes into an unswelled configuration, resulting in wide interstitial spaces for hydrocarbons to flow. In the event of water encroachment, the swellable organic polymer may again adopt the swelled configuration and prevent water flowback during hydrocarbon production. Although some embodiments of the present invention have been described in relation to hydraulic fracturing operations, the swellable organic polymer particulates or swellable organic polymer coated proppant particulates may be used in any subterranean operation, such as gravel packing or part of pre-packed screens, for example.

I. Base Fluid

Suitable base fluids for use in conjunction with the present invention may include, but are not limited to, aqueous-based fluids, aqueous-miscible fluids, water-in-oil emulsions, or oil-in-water emulsions. Suitable aqueous-based fluids may include fresh water, saltwater (e.g., water containing one or more salts dissolved therein), brine (e.g., saturated salt water), seawater, and any combination thereof. Suitable aqueous-miscible fluids may include, but not be limited to, alcohols, e.g., methanol, ethanol, n-propanol, isopropanol, n-butanol, sec-butanol, isobutanol, and t-butanol; glycerins; glycols, e.g., polyglycols, propylene glycol, and ethylene glycol; polyglycol amines; polyols; any derivatives thereof; any in combination with salts, e.g., sodium chloride, calcium chloride, calcium bromide, zinc bromide, potassium carbonate, sodium formate, potassium formate, cesium formate, sodium acetate, potassium acetate, calcium acetate, ammonium acetate, ammonium chloride, ammonium bromide, sodium nitrate, potassium nitrate, ammonium nitrate, ammonium sulfate, calcium nitrate, sodium carbonate, and potassium carbonate; any in combination with an aqueous-based fluid; and any combinations thereof. Suitable water-in-oil emulsions, also known as invert emulsions, may have an oil-to-water ratio from a lower limit of greater than about 50:50, 55:45, 60:40, 65:35, 70:30, 75:25, or 80:20 to an upper limit of less than about 100:0, 95:5, 90:10, 85:15, 80:20, 75:25, 70:30, or 65:35 by volume in the base fluid, where the amount may range from any lower limit to any upper limit and encompass any subset there between. Examples of suitable invert emulsions include those disclosed in U.S. Pat. Nos. 5,905,061, 5,977,031, 6,828,279, 7,534,745, 7,645,723, and 7,696,131, each of which are incorporated herein by reference. It should be noted that for water-in-oil and oil-in-water emulsions, any mixture of the above may be used including the water being and/or comprising an aqueous-miscible fluid.

In certain embodiments, the pH of the base fluid may be adjusted (e.g., by a buffer or other pH adjusting agent). In these embodiments, the pH may be adjusted to a specific level, which may depend on, among other factors, the types of additives included in the treatment fluid. Additives suitable for use in the present invention may include, but are not limited to, viscosifying agents, buffering agents, pH adjusting agents, biocides, bactericides, friction reducers, solubilizer, or any combinations thereof. One of ordinary skill in the art, with the benefit of this disclosure, will recognize when such pH adjustments or additives are appropriate.

II. Proppant Particulates

A. Proppant Particulates—Size and Shape

Proppant particulates suitable for use in the methods of the present invention may be of any size and shape combination known in the art as suitable for use in a fracturing operation. Generally, where the chosen proppant is substantially spherical, suitable proppant particulates have a size in the range of from about 2 to about 400 mesh, U.S. Sieve Series. In some embodiments of the present invention, the proppant particulates have a size in the range of from about 20 to about 180 mesh, U.S. Sieve Series.

In some embodiments of the present invention, it may be desirable to use substantially non-spherical proppant particulates. Suitable substantially non-spherical proppant particulates may be cubic, polygonal, fibrous, or any other non-spherical shape. Such substantially non-spherical proppant particulates may be, for example, cubic-shaped, rectangular-shaped, rod-shaped, ellipse-shaped, cone-shaped, pyramid-shaped, or cylinder-shaped. That is, in embodiments wherein the proppant particulates are substantially non-spherical, the aspect ratio of the material may range such that the material is fibrous to such that it is cubic, octagonal, or any other configuration. Substantially non-spherical proppant particulates are generally sized such that the longest axis is from about 0.02 inches to about 0.3 inches in length. In other embodiments, the longest axis is from about 0.05 inches to about 0.2 inches in length. In one embodiment, the substantially non-spherical proppant particulates are cylindrical having an aspect ratio of about 1.5 to 1 and about 0.08 inches in diameter and about 0.12 inches in length. In another embodiment, the substantially non-spherical proppant particulates are cubic having sides about 0.08 inches in length. The use of substantially non-spherical proppant particulates may be desirable in some embodiments of the present invention because, among other things, they may provide a lower rate of settling when slurried into a fluid as is often done to transport proppant particulates to desired locations within subterranean formations. It is within the ability of one of ordinary skill in the art, with the benefit of this disclosure, to determine the size and shape of proppant particulates to include in the methods of the present invention.

B. Proppant Particulates—Materials

Proppant particulates suitable for use in the present invention may comprise any material suitable for use in subterranean operations. Suitable materials for these proppant particulates include, but are not limited to, sand, bauxite, ceramic materials, glass materials, polymer materials (such as EVA or composite materials), polytetrafluoroethylene materials, nut shell pieces, cured resinous particulates comprising nut shell pieces, seed shell pieces, cured resinous particulates comprising seed shell pieces, fruit pit pieces, cured resinous particulates comprising fruit pit pieces, wood, composite particulates, and any combinations thereof. Suitable composite particulates may comprise a binder and a filler material wherein suitable filler materials include silica, alumina, fumed carbon, carbon black, graphite, mica, titanium dioxide, barite, meta-silicate, calcium silicate, kaolin, talc, zirconia, boron, fly ash, hollow glass microspheres, solid glass, and any combinations thereof.

III. Consolidating Agents

In some embodiments, the proppant particulates of the present invention may be coated with a consolidating agent to enhance or promote the consolidation of the proppant particulates and/or the swellable organic polymer particulates to one another to form a proppant pack. Consolidating agents may act to improve the clustering capacity, tensile strength, and flowback control ability of the proppant pack. Consolidating agents may additionally promote homogeneous distribution of the swellable organic polymer particulates or swellable organic polymer coated proppant particulates within the proppant pack by reducing or preventing any tendency of them to flow out of the proppant pack within the fracture in the subterranean formation. A consolidating agent may be particularly useful for this purpose if the swellable organic polymer particulates or swellable organic polymer coated proppant particulates have a low density or specific gravity or have a substantially different particulate size than the proppant particulates.

Suitable consolidating agents may include, but are not limited to, non-aqueous tackifying agents, aqueous tackifying agents, emulsified tackifying agents, silyl-modified polyamide compounds, resins, crosslinkable aqueous polymer compositions, polymerizable organic monomer compositions, consolidating agent emulsions, zeta-potential modifying aggregating compositions, silicon-based resins, and binders. Combinations and/or derivatives of these also may be suitable. Nonlimiting examples of suitable non-aqueous tackifying agents may be found in U.S. Pat. Nos. 7,392,847; 7,350,579; 5,853,048; 5,839,510; and 5,833,000, the entire disclosures of which are herein incorporated by reference. Nonlimiting examples of suitable aqueous tackifying agents may be found in U.S. Pat. Nos. 8,076,271; 7,131,491; 5,249, 627; and 4,670,501, the entire disclosures of which are herein incorporated by reference. Nonlimiting examples of suitable crosslinkable aqueous polymer compositions may be found in U.S. Patent Application Publication Nos. 2010/0160187 and U.S. Pat. No. 8,136,595 the entire disclosures of which are herein incorporated by reference. Nonlimiting examples of suitable silyl-modified polyamide compounds may be found in U.S. Pat. No. 6,439,309, the entire disclosure of which is herein incorporated by reference. Nonlimiting examples of suitable resins may be found in U.S. Pat. Nos. 7,673,686; 7,153,575; 6,677,426; 6,582,819; 6,311,773; and 4,585,064 as well as U.S. Patent Application Publication No. and 2008/0006405 and U.S. Pat. No. 8,261,833, the entire disclosures of which are herein incorporated by reference. Nonlimiting examples of suitable polymerizable organic monomer compositions may be found in U.S. Pat. No. 7,819, 192, the entire disclosure of which is herein incorporated by reference. Nonlimiting examples of suitable consolidating agent emulsions may be found in U.S. Patent Application Publication No. 2007/0289781 the entire disclosure of which is herein incorporated by reference. Nonlimiting examples of suitable zeta-potential modifying aggregating compositions may be found in U.S. Pat. Nos. 7,956,017 and 7,392,847, the entire disclosures of which are herein incorporated by reference. Nonlimiting examples of suitable silicon-based resins may be found in Application Publication Nos. 2011/0098394, 2010/0179281, and U.S. Pat. Nos. 8,168,739 and 8,261,833, the entire disclosures of which are herein incorporated by reference. Nonlimiting examples of suitable binders may be found in U.S. Pat. Nos. 8,003,579; 7,825,074; and 6,287,639, as well as U.S. Patent Application Publication No. 2011/0039737, the entire disclosures of which are herein incorporated by reference. It is within the ability of one skilled in the art, with the benefit of this disclosure, to determine the type and amount of consolidating agent to include in the methods of the present invention to achieve the desired results.

In the present invention, all or a portion of the proppant particulates may be coated with a consolidating agent. In embodiments in which the consolidating agent must cure (e.g., curable resins), the consolidating agent may cure prior to introducing the proppant particulates into the treatment fluid, prior to introducing the proppant particulates downhole, after placement within a fracture, or at any other time or in response to any other subterranean condition depending on the particular fracturing and/or producing operation. In preferred embodiments, curing of a consolidating agent is achieved prior to the swellable organic polymer of the swellable organic polymer particulates or swellable organic polymer coated proppant particulates adopting an unswelled configuration (e.g., before hydrocarbon production).

IV. Swellable Organic Polymers

The present invention provides a swellable organic polymer that may be used in treating a subterranean formation. The swellable organic polymer is water-swellable and may possess two configurations: a swelled configuration when contacted with water and an unswelled configuration in the absence of water contact. Suitable sources of water that may cause the swellable organic polymer to swell include, but are not limited to, fresh water, brackish water, seawater, brine, and any combination thereof in any proportion. The swellable organic polymer may be used in the methods of the present invention alone as swellable organic particulates or may be coated onto proppant particulates as swellable organic polymer coated proppant particulates. In some embodiments, the unswelled configuration of the swellable organic polymer particulate or the swellable organic polymer coated proppant particulate has a size distribution range such that at least 90% of the swellable organic polymer particulate or the swellable organic polymer coated proppant particulate has a size of about 0.01 mm to about 5 mm. In the swelled configuration, the swellable organic polymer particulate or the swellable organic polymer coated proppant particulate may have a size of about 30 times its original size.

Suitable swellable organic polymers for use in the present invention include, but are not limited to, cross-linked polyacrylamide, cross-linked polyacrylate, cross-linked copolymers of acrylamide and acrylate monomers, starch grafted with cross-linked acrylonitrile and acrylate, cross-linked polymers of two or more of allylsulfonate, 2-acrylamido-2-methyl-1-propanesulfonic acid, 3-allyloxy-2-hydroxy-1-propanesulfonic acid, acrylamide, acrylic acid monomers, salts of cross-linked polymeric material, copolymers of a cross-linked vinyl silane and at least one water soluble organic monomer, cross-linked cationic water soluble polymers, and any combination thereof in any proportion. Typical examples of suitable salts of cross-linked polymeric material include, but are not limited to, salts of carboxyalkyl starch, salts of carboxymethyl starch, salts of carboxymethyl cellulose, salts of cross-linked carboxyalkyl polysaccharide, starch grafted with acrylonitrile and acrylate monomers, and any combination thereof in any proportion. Typical examples of suitable cross-linked copolymers of vinyl silane include, but are not limited to, vinyltrichlorosilane, vinyltris(beta-methoxyethoxy)silane, vinyltriethoxysilane, vinyltrimethoxysilane, methacrylatetrimethoxysilane, methacrylatetriethoxysilane, and any combinations thereof. Suitable water soluble organic monomers for use with the cross-linked copolymers of vinyl silane include, but are not limited to, 2-hydroxyethyl acrylate, polyalkylacrylate, acrylamide, vinylmethyl ether, methacrylamide, vinylpyrrolidone, and any combinations thereof. Suitable cross-linked cationic water soluble polymers include, but are not limited to, quaternized ammonium salt of polydialkyldiallyl polymers, quaternized ammonium salt of polyethyleneimine polymers, quaternized ammonium salt of polydimethylaminoethylmethacrylate copolymers, quaternized ammonium salt of poly N-(3-dimethylaminopropyl)acrylamide polymers, and any combinations thereof. The specific features of the swellable organic polymer may be chosen or modified to provide a proppant pack with desired permeability while maintaining adequate propping and filtering capability.

In some embodiments, the present invention provides a method of treating a subterranean formation comprising: providing a treatment fluid comprising a base fluid, proppant particulates, and swellable organic polymer particulates, wherein the swellable organic polymer particulates are water-swellable, having a swelled configuration when contacted with water and an unswelled configuration in the absence of water contact; encapsulating the swellable organic polymer particulates in a degradable encapsulating material; introducing the treatment fluid into a fracture in the subterranean formation; allowing the degradable encapsulating material to degrade; allowing the swellable organic polymer particulates to adopt the swelled configuration so as to form a proppant pack in the fracture; and allowing the swellable organic polymer particulates to adopt the unswelled configuration during hydrocarbon production. The swellable organic polymer particulates or swellable organic polymer coated proppant particulates of the present invention may be encapsulated in a degradable encapsulating material in order to delay their swelling in the presence of water contact. The encapsulation of the swellable organic polymer particulates or swellable organic polymer coated proppant particulates may be designed to breakdown or degrade in response to, for example, time or subterranean conditions, such as temperature or pressure. The swellable organic polymer particulates or swellable organic polymer coated proppant particulates of the present invention may be encapsulated by any known material capable of breaking down or degrading under known conditions provided that it does not contain components that might adversely affect the stability and/or performance of the treatment fluids of the present invention. Suitable degradable encapsulating materials include, but are not limited to, waxes, drying oils such as tung oil and linseed oil, polyurethanes, crosslinked partially hydrolyzed polyacryics, and any combinations thereof. Degradable encapsulating materials may be applied to the swellable organic polymer particulates or swellable organic polymer coated proppant particulates by any known method suitable for the degradable encapsulating material used, such as spray coating, for example.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope and spirit of the present invention. The invention illustratively disclosed herein suitably may be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces. If there is any conflict in the usages of a word or term in this specification and one or more patent or other documents that may be incorporated herein by reference, the definitions that are consistent with this specification should be adopted.

The invention claimed is:

1. A method of treating a subterranean formation comprising:
    providing a treatment fluid comprising a base fluid and proppant particulates coated with a swellable organic polymer to form swellable organic polymer coated proppant particulates,
        wherein the swellable organic polymer coated proppant particulates are water-swellable, having a swelled configuration when contacted with water and an unswelled configuration in the absence of water contact, and
        wherein the swellable organic polymer coated proppant particulates have a size distribution such that at least 90% have a size of 0.01 mm to 5 mm in the unswelled configuration;
    introducing the treatment fluid into a fracture in the subterranean formation;
    swelling the swellable organic polymer coated proppant particulates so as to adopt the swelled configuration and form a proppant pack in the fracture,
        wherein the swelled configuration has a size of about 30 times the unswelled configuration such that the proppant pack exhibits a porosity of greater than about 40% upon closure of the fracture and during hydrocarbon production; and
    unswelling the swellable organic polymer coated proppant particulates so as to adopt the unswelled configuration during hydrocarbon production, thereby exhibiting the porosity of greater than about 40%.

2. The method of claim 1, wherein the swellable organic polymer coated proppant particulates adopt the swelled configuration during a water production phase in the subterranean formation.

3. The method of claim 1, wherein the swellable organic polymer coated proppant particulates are encapsulated in a degradable encapsulating material.

4. The method of claim 1, wherein the swellable organic polymer coated proppant particulates are in the swelled configuration prior to introducing the treatment fluid into the fracture in the subterranean formation.

5. The method of claim 1, wherein the swellable organic polymer coated proppant particulates are in the unswelled configuration prior to introducing the treatment fluid into the fracture in the subterranean formation.

6. The method of claim 1, wherein the swellable organic polymer is selected from the group consisting of cross-linked polyacrylamide; cross-linked polyacrylate; cross-linked copolymers of acrylamide and acrylate monomers; starch grafted with cross-linked acrylonitrile and acrylate; cross-linked polymers of two or more of allylsulfonate, 2-acrylamido-2-methyl-1-propanesulfonic acid, 3-allyloxy-2-hydroxy-1-propanesulfonic acid, acrylamide, and acrylic acid monomers; salts of cross-linked polymeric material; copolymers of a cross-linked vinyl silane and at least one water soluble organic monomer; cross-linked cationic water soluble polymers; and any combination thereof.

7. The method of claim 6, wherein the salts of cross-linked polymeric material are selected from the group consisting of salts of carboxyalkyl starch; salts of carboxymethyl starch; salts of carboxymethyl cellulose; salts of cross-linked carboxyalkyl polysaccharide; starch grafted with acrylonitrile and acrylate monomers; and any combination thereof.

8. The method of claim 6, wherein the copolymers of cross-linked vinyl silane are selected from the group consisting of vinyltrichlorosilane; vinyltris (beta-methoxyethoxy) silane; vinyltriethoxysilane; vinyltrimethoxysilane; methacrylatetrimethoxysilane; methacrylatetriethoxysilane; and any combinations thereof and wherein the at least one water soluble organic monomer is selected from the group consisting of 2-hydroxyethyl acrylate; polyalkylacrylate; acrylamide; vinylmethyl ether; methacrylamide; vinylpyrrolidone; and any combinations thereof.

9. The method of claim 6, wherein the cross-linked cationic water soluble polymers are selected from the group consisting of quaternized ammonium salt of polydialkyldiallyl polymers; quaternized ammonium salt of polyethyleneimine polymers; quaternized ammonium salt of polydimethylaminoethyl-methacrylate copolymers; quaternized ammonium salt of poly N-(3-dimethylaminopropyl)acrylamide polymers; and any combinations thereof.

10. A method of treating a subterranean formation comprising:
    providing a treatment fluid comprising a base fluid, proppant particulates, and swellable organic polymer particulates,
        wherein the swellable organic polymer particulates are water-swellable, having a swelled configuration when contacted with water and an unswelled configuration in the absence of water contact, and
        wherein the swellable organic polymer particulates have a size distribution such that at least 90% have a size of 0.01 mm to 5 mm in the unswelled configuration;
    introducing the treatment fluid into a fracture in the subterranean formation;
    swelling the swellable organic polymer particulates so as to adopt the swelled configuration and form a proppant pack in the fracture,
        wherein the swelled configuration has a size of about 30 times the unswelled configuration such that the proppant pack exhibits a porosity of greater than about 40% upon closure of the fracture and during hydrocarbon production; and
    unswelling the swellable organic polymer particulates so as to adopt the unswelled configuration during hydrocarbon production, thereby exhibiting the Porosity of greater than about 40%.

11. The method of claim 10, wherein the swellable organic polymer particulates adopt the swelled configuration during a water production phase in the subterranean formation.

12. The method of claim 10, wherein the treatment fluid further comprises a consolidating agent selected from the group consisting of two component epoxy based resins; novolak resins; polyepoxide resins; phenol-aldehyde resins; urea-aldehyde resins; urethane resins; phenolic resins; furan resins; furan/furfuryl alcohol resins; phenolic/latex resins; phenol formaldehyde resins; polyester resins and hybrids and copolymers thereof; polyurethane resins and hybrids and copolymers thereof; acrylate resins; silicon-based resins; any derivatives thereof; and any combinations thereof.

13. The method of claim 10, wherein the swellable organic polymer particulates are in the swelled configuration prior to introducing the treatment fluid into the fracture in the subterranean formation.

14. The method of claim 10, wherein the swellable organic polymer particulates are in the unswelled configuration prior to introducing the treatment fluid into the fracture in the subterranean formation.

15. The method of claim 10, wherein the swellable organic polymer is selected from the group consisting of cross-linked polyacrylamide; cross-linked polyacrylate; cross-linked copolymers of acrylamide and acrylate monomers; starch grafted with cross-linked acrylonitrile and acrylate; cross-linked polymers of two or more of allylsulfonate, 2-acrylamido-2-methyl-1-propanesulfonic acid, 3-allyloxy-2-hydroxy-1-propanesulfonic acid, acrylamide, and acrylic acid monomers; salts of cross-linked polymeric material; copolymers of a cross-linked vinyl silane and at least one water soluble organic monomer; cross-linked cationic water soluble polymers; and any combination thereof.

16. The method of claim 15, wherein the salts of cross-linked polymeric material are selected from the group consisting of salts of carboxyalkyl starch; salts of carboxymethyl starch; salts of carboxymethyl cellulose; salts of cross-linked carboxyalkyl polysaccharide; starch grafted with acrylonitrile and acrylate monomers; and any combination thereof.

17. The method of claim 15, wherein the copolymers of cross-linked vinyl silane are selected from the group consisting of vinyltrichlorosilane; vinyltris (beta-methoxyethoxy) silane; vinyltriethoxysilane; vinyltrimethoxysilane; methacrylatetrimethoxysilane; methacrylatetriethoxysilane; and any combinations thereof and wherein the at least one water soluble organic monomer is selected from the group consisting of 2-hydroxyethyl acrylate; polyalkylacrylate; acrylamide; vinylmethyl ether; methacrylamide; vinylpyrrolidone; and any combinations thereof.

18. The method of claim 15, wherein the cross-linked cationic water soluble polymers are selected from the group consisting of quaternized ammonium salt of polydialkyldiallyl polymers; quaternized ammonium salt of polyethyleneimine polymers; quaternized ammonium salt of polydimethylaminoethyl-methacrylate copolymers; quaternized ammonium salt of poly N-(3-dimethylaminopropyl)acrylamide polymers; and any combinations thereof.

19. A method of treating a subterranean formation comprising:
   providing a treatment fluid comprising a base fluid, proppant particulates, and swellable organic polymer particulates,
      wherein the swellable organic polymer particulates are water-swellable, having a swelled configuration when contacted with water and an unswelled configuration in the absence of water contact, and
      wherein the swellable organic polymer particulates have a size distribution such that at least 90% have a size of 0.01 mm to 4 mm in the unswelled configuration;
   encapsulating the swellable organic polymer particulates in a degradable encapsulating material;
   introducing the treatment fluid into a fracture in the subterranean formation;
   degrading the degradable encapsulating material;
   swelling the swellable organic polymer particulates so as to adopt the swelled configuration and form a proppant pack in the fracture,
      wherein the swelled configuration has a size of about 30 times the unswelled configuration such that the proppant pack exhibits a porosity of greater than about 40% upon closure of the fracture and during hydrocarbon production; and
   unswelling the swellable organic polymer particulates so as to adopt the unswelled configuration during hydrocarbon production, thereby exhibiting the Porosity of greater than about 40%.

20. The method of claim 19, wherein the swellable organic polymer particulates adopt the swelled configuration during a water production phase in the subterranean formation.

* * * * *